United States Patent [19]

Warner et al.

[11] Patent Number: 4,475,135

[45] Date of Patent: Oct. 2, 1984

[54] MAGNETIC HEAD AIR BEARING SLIDER

[75] Inventors: Michael W. Warner, Stamford, Conn.; Michael F. Garnier, San Jose, Calif.

[73] Assignee: International Business Machines, Armonk, N.Y.

[21] Appl. No.: 559,530

[22] Filed: Dec. 7, 1983

Related U.S. Application Data

[63] Continuation of Ser. No. 309,300, Oct. 7, 1981, abandoned.

[51] Int. Cl.$^3$ .............................................. H04N 7/00
[52] U.S. Cl. .................................................... 360/103
[58] Field of Search ............... 360/102, 103, 122, 128, 360/129; 308/9

[56] References Cited

U.S. PATENT DOCUMENTS 3,855,625  12/1974  Garnier et al. ...................... 360/103
4,218,715  8/1980  Garnier ............................. 360/103

FOREIGN PATENT DOCUMENTS 55-105858  8/1980  Japan .................................. 360/103
56-105359  8/1981  Japan .................................. 360/103

OTHER PUBLICATIONS

IEEE Transactions on Magnetics, vol. MAG-16, No. 5, Sep. 1980, pp. 785–787, Floating Thin Film Head Fabricated by Ion Etching Method, Nakanishi et al.
IBM Technical Disclosure Bulletin, vol. 24, No. 6, Nov. 1981, pp. 2803–2804, Magnetic Head Air Bearing Slider, Decker et al.
IBM Technical Disclosure Bulletin, vol. 24, No. 11B, Apr. 1982, p. 6202, Air Bearing Magnetic Head, Jacobs.
IBM Technical Disclosure Bulletin, vol. 22, No. 1, Jun. 1979, p. 333, Self–Loading Slider, Watrous.
IBM Technical Disclosure Bulletin, vol. 12, No. 5, Oct. 1969 p. 674, Antistick Transducer, Aweida et al.

Primary Examiner—George G. Stellar
Attorney, Agent, or Firm—N. N. Kallman; Otto Schmid, Jr.

[57] ABSTRACT

A self-loading magnetic head air bearing slider is formed with a taper across the full width at its leading edge. The air bearing slider has two rails along its sides and a recess between the rails. The structure of the rails is preferably flared to provide an improved pressure profile thereby to allow fast liftoff from a disk surface.

9 Claims, 6 Drawing Figures

MAGNETIC HEAD AIR BEARING SLIDER

This is a continuation of application Ser. No. 309,300 filed Oct. 7, 1981, now abandoned.

CROSS REFERENCE TO RELATED PATENT

U.S. Pat. No. 3,855,625, issued Dec. 17, 1974, to M. F. Garnier et al, describes a magnetic head air bearing slider having side rails and a recessed section between the rails. The present invention is a modification and improvement of the patented slider assembly.

DESCRIPTION

Technical Field

This invention relates to a self-loading magnetic head air bearing slider.

An object of this invention is to provide a self-loading magnetic head air bearing slider for achieving fast liftoff from a rotating disk surface.

Another object is to provide a magnetic head air bearing slider that maintains a substantially constant flying height over all the data tracks registered on the surface of a rotating disk.

Another object of this invention is to provide a magnetic head air bearing slider having improved wear characteristics and longer life.

Another object is to provide a magnetic head air bearing slider that is easy to fabricate and yet provides enhanced performance.

BACKGROUND OF THE INVENTION

Magnetic head assemblies that fly relative to magnetic disks have been used extensively. The objectives for improving the transducing relationship between a magnetic transducer and a magnetic disk include a close spacing between the transducer and the disk, and to maintain such spacing constant. The close spacing, when used with very narrow transducing gaps and very thin magnetic record films, allows short wave length, high frequency signals to be recorded, thereby affording high density, high storage capacity recording.

In accessing type disk drives, for example, the flying height of the magnetic head assembly varies as the head is moved radially to different data tracks because the linear speed of the rotating disk at the outer tracks is greater than that at the inner tracks. To compensate for these variations in flying height, different magnitudes of write current must be used for different radial zones to obtain a substantially constant signal amplitude of the recorded data. Therefore, a constant head to disk spacing is desirable to reduce the requirements for such compensation.

Some presently known magnetic disk files operate in a start-stop contact mode, i.e., the magnetic heads are in contact with the magnetic disk surface when the disk starts to rotate and when the disk rotational speed approaches and reaches zero. It is apparent that the longer it takes for the heads to lose contact with the disk surface, the more wear and shorter usage life of the heads will result.

BRIEF DESCRIPTION OF THE DRAWINGS

The invention will be described in detail with reference to the drawing in which.

Similar numerals refer to similar elements throughout the drawing.

DISCLOSURE OF THE INVENTION

With reference to FIGS. 1a–d, alternative configurations of magnetic head sliders that incorporate features of the invention are depicted. Each slider has a full taper section 10 across the entire width of the slider at the leading edge 12.

Figure 1A:
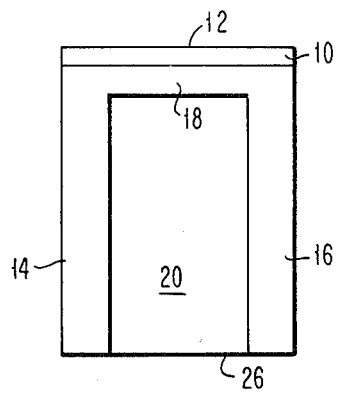
FIGS. 1a–d represent alternative embodiments of an air bearing slider incorporating the invention.

In FIG. 1a, two side rails 14 and 16 are connected by a cross rail 18. The surfaces of the side rails and cross rail are coplanar. The three rails enclose a recessed section 20 that defines a subambient pressure zone or negative pressure region. The recessed section 20 may be of constant depth or have a tapered sloping geometry. This pressure zone provides the self loading effect of the slider, precluding the need for an external loading force, such as a spring force or hydraulic force used in the prior art. This negative pressure region can be formed with a single step, which may be by a machining or etching process.

In accordance with this invention, the full width taper at the leading edge of the slider provides a faster lift off of the head from the disk than prior art designs. As the mean time to failure for start/stop wear is proportional to the distance traveled in contact with the disk, before reaching glide height, the slider of this invention exhibits a significant improvement in start/-stop life.

Figure 1B:
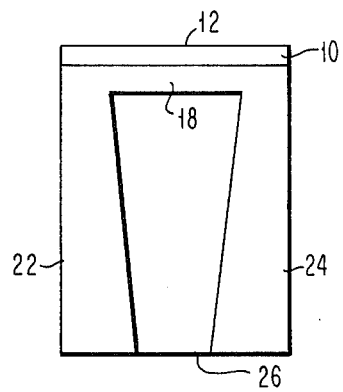

FIG. 1b illustrates an alternative configuration of an air bearing slider in which the rails 22 and 24 are flared so that the recessed area at the trailing edge 26 is narrowed and the negative pressure region is trapezoidal in form.

Figure 1C:
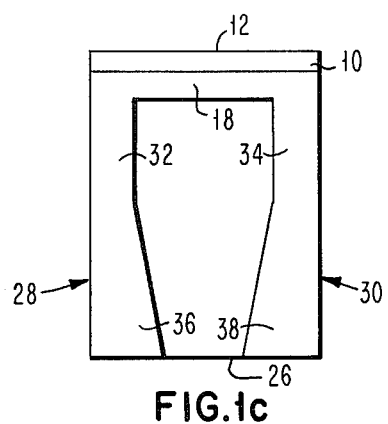

FIG. 1c illustrates another alternative of an air bearing slider in which the rails 28 and 30 have parallel sections 32 and 34 up to a break point and then have flared sections 36 and 38 extending towards the trailing edge 26.

Figure 1D:
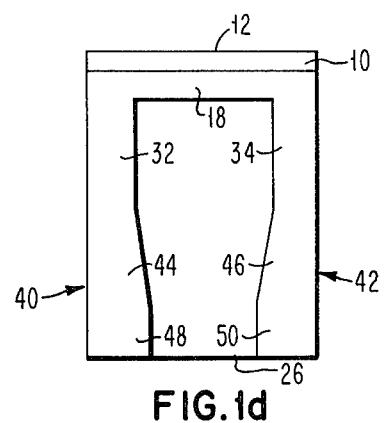

The alternative design of FIG. 1d includes rails 40 and 42 having parallel sections 32 and 34 followed by flared sections 44 and 46 and ending in parallel sections 48 and 50 adjacent to the trailing edge.

It should be understood that the location of the break point is variable, and therefore the lengths of the parallel sections and flared sections are also variable. In addition, the angle of flare of the side rails may be varied.

Each of the self-loading slider configurations is characterized by a full width taper section at the leading edge, two side rails of variable geometries, a connecting rail following the taper section and a recessed section between the rails. The taper section is made by lapping, as is well known in the art. The rails may have different configurations that will determine flying height, the stiffness, and stability of the air bearing slider. The slider configurations require only one step to form the recessed section, which may be ten microns in depth relative to the rail surfaces. In an implementation of the invention, a slider is formed that is about four millimeters in length, three millimeters wide and 1.0 millimeters high, with the taper section length from the leading edge to the cross rail being about 0.4 millimeters.

Figure 2:
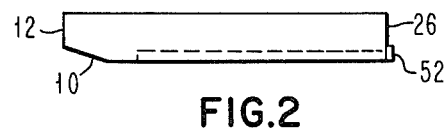
FIG. 2 is a side view of an air bearing slider made in accordance with this invention.

FIG. 2 represents a side view of the air bearing slider with the recessed section 26 delineated by the dotted line portion. A magnetic head or transducer 52 is disposed at the trailing edge so that the transducing gap is at the air bearing surface of the slider.

Figure 3:
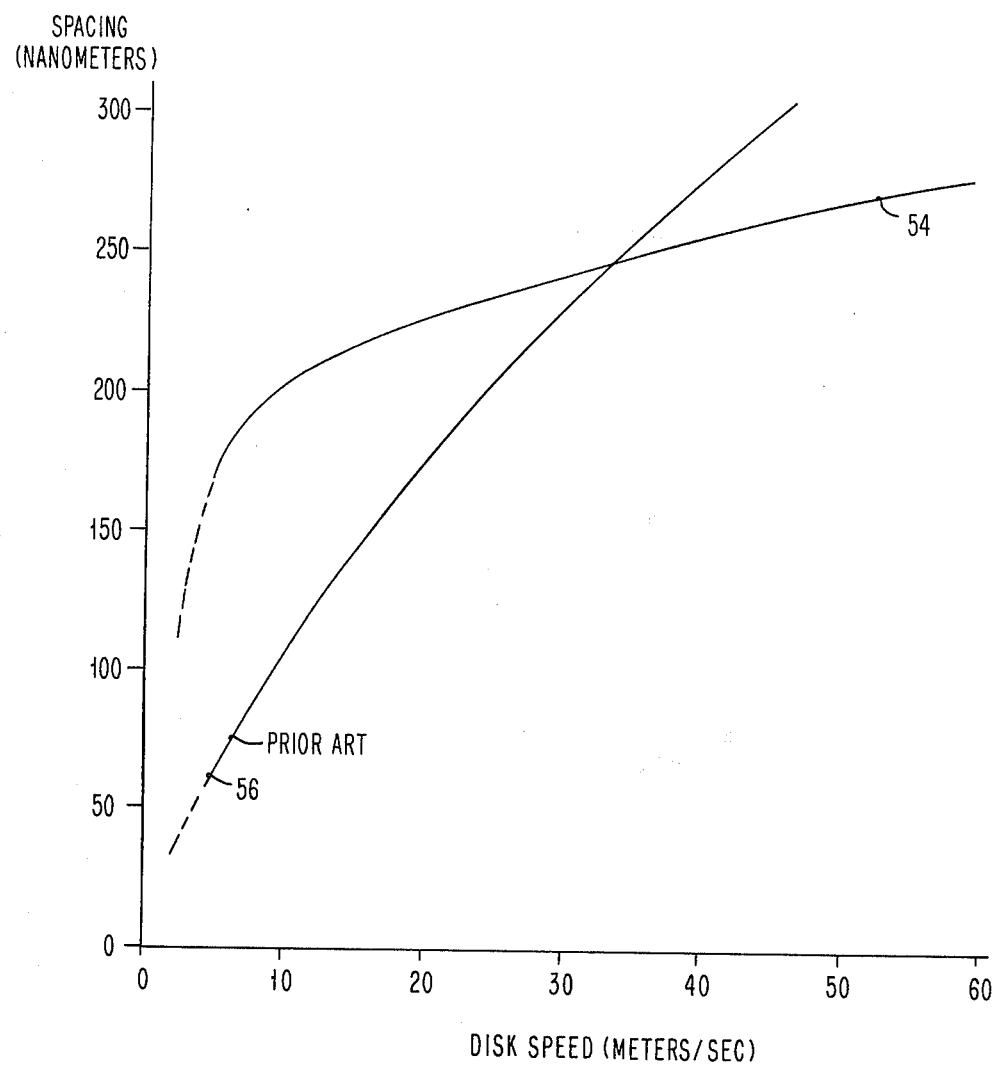
FIG. 3 depicts two curves plotting flying height, i.e. the spacing between the magnetic head slider and the rotating disk, against disk speed, for prior art head sliders as compared to the head sliders of this invention.

FIG. 3 illustrates by curve 54 the fast liftoff of the self-loading slider of this invention to a substantially constant spacing from the disk surface, as compared to the prior art slider slower liftoff with greater variation in head to disk spacing, illustrated by curve 56.

The self-loading, air bearing slider of this invention realizes a distinct advantage over prior art heads in the fast liftoff performance with resultant increased wear life and, in addition, is easier to fabricate by the one-step processing of the recessed region. The air bearing slider serves to maintain a substantially constant flying height over all the data tracks on a disk surface, thereby minimizing the need for recording channel compensation.

It should be understood that the slider configuration having a full width taper at the leading edge disclosed herein may be modified within the scope of this invention. For example, the siderails may be arcuate in design.

What is claimed is:

1. A self-loading air bearing slider for supporting a transducer comprising:
    a slider structure having leading and trailing edges;
    a tapered section formed across the full width of said slider structure at said leading edge;
    side rails disposed along the sides of an air bearing surface of said slider structure, said rails extending from said tapered portion to said trailing edge; and
    a cross rail connecting said side rails, said side rails having parallel sections connected to said cross rails and extending toward the trailing edge to a break point, each of said side rails being wider at said trailing edge of said slider structure than at said break point, said cross rail being formed adjacent to said tapered section so that said cross rail and said side rails have coplanar surfaces and define a recessed section trailing said cross rail, said recessed section being open at said trailing edge.

2. A self-loading air bearing slider for supporting a transducer, comprising:
    two spaced side rails joined at their respective ends to an integrally formed cross rail, said cross rail being uniformly beveled across its full width at what constitutes the leading edge of the slider, all said rails being of constant uninterrupted height throughout except where beveled,
    said side rails and cross rail defining a generally U-shaped structure providing a slot extending inwardly from what constitutes the trailing edge of the slider, said slot terminating at said cross rail, and the sides of said slot diverging at equal angles and for equal distances along one portion of their length and parallel throughout the remaining portion of their length.

3. A self-loading air bearing slider as in claim 2 wherein said one portion starts at said trailing edge and terminates at a break point.

4. A self-loading air bearing slider as in claim 2 wherein said one portion starts intermediate said trailing edge and said break point and terminates at said break point.

5. A self-loading air bearing slider as in claim 2 wherein said cross rail is beveled for only a part of its height.

6. A self-loading air bearing slider as in claim 2 wherein said slot has a tapered sloping geometry.

7. A self-loading air bearing slider as in claim 2 wherein said slot serves as a negative pressure region.

8. A self-loading air bearing slider as in claim 7, including a magnetic transducer mounted at said trailing edge of said slider structure and at an air bearing surface of said structure.

9. A self-loading air bearing slider as in claim 8 wherein said side rails, said cross rails and said slot produce a combined pressure profile when said air bearing slider is positioned adjacent a moving magnetic medium so that said magnetic transducer is maintained at a substantially constant spacing from said moving magnetic medium.

* * * * *